United States Patent [19]

Wyness

[11] Patent Number: 4,614,596

[45] Date of Patent: Sep. 30, 1986

[54] APPARATUS AND METHOD FOR DISSOLVING A GAS IN AN AQUEOUS STREAM

[76] Inventor: David K. Wyness, 1624 Willemoore, Springfield, Ill. 62704

[21] Appl. No.: 690,126

[22] Filed: Jan. 10, 1985

[51] Int. Cl.⁴ .............................................. C02F 1/72
[52] U.S. Cl. .................................... 210/754; 210/760; 210/787; 210/205; 210/220; 261/79 A
[58] Field of Search ............... 210/752, 754, 758, 760, 210/787, 788, 205, 209, 220, 512.1, 199; 261/79 A

[56] References Cited

U.S. PATENT DOCUMENTS

| | | | |
|---|---|---|---|
| 3,105,778 | 10/1963 | Anderson | 261/79 A |
| 3,390,076 | 6/1968 | Dubach | 210/512.1 X |
| 3,771,290 | 11/1973 | Stethem | 210/512.1 X |
| 3,775,314 | 11/1973 | Beitzel et al. | 210/760 |
| 3,862,907 | 1/1975 | Shimotsuma et al. | 261/79 A X |
| 3,996,027 | 12/1976 | Schnell et al. | 210/512.1 X |
| 4,267,131 | 5/1981 | Prudhon et al. | 261/79 A X |
| 4,274,968 | 6/1981 | Grutsch et al. | 210/512.1 X |
| 4,302,226 | 11/1981 | Rafson et al. | 261/79 A X |

Primary Examiner—Thomas Wyse

Attorney, Agent, or Firm—Marshall, O'Toole, Gerstein, Murray & Bicknell

[57] ABSTRACT

A method of dissolving a gas in water comprising directing an aqueous stream to rotate in a downwardly moving spiral stream from a high downward velocity to a lower downward velocity and diffusing a gas into the aqueous stream so as to produce small gas bubbles which are rotated in a generally spiral path by the aqueous stream thereby providing a long flow distance over which the bubbles have increased contact time with the aqueous stream to facilitate dissolution of the gas therein and in which rising of the gas bubbles is progressively opposed by the increased downward velocity of the higher portion of the aqueous stream.

A vessel for practicing the method can have a vertical axis and be circular in horizontal section for most of its height; have upper and lower ends; include a conical portion with the apex at the upper end of the vessel; have an aqueous stream inlet tangential to the vessel communicating with the vessel interior space near the vessel upper end so that an aqueous stream fed to the vessel through the inlet rotates in a downwardly moving spiral stream from a high downward velocity in the upper portion of the vessel to a lower downward velocity in the lower portion of the vessel; and have a gas diffuser for diffusing a gas into the aqueous stream.

31 Claims, 4 Drawing Figures

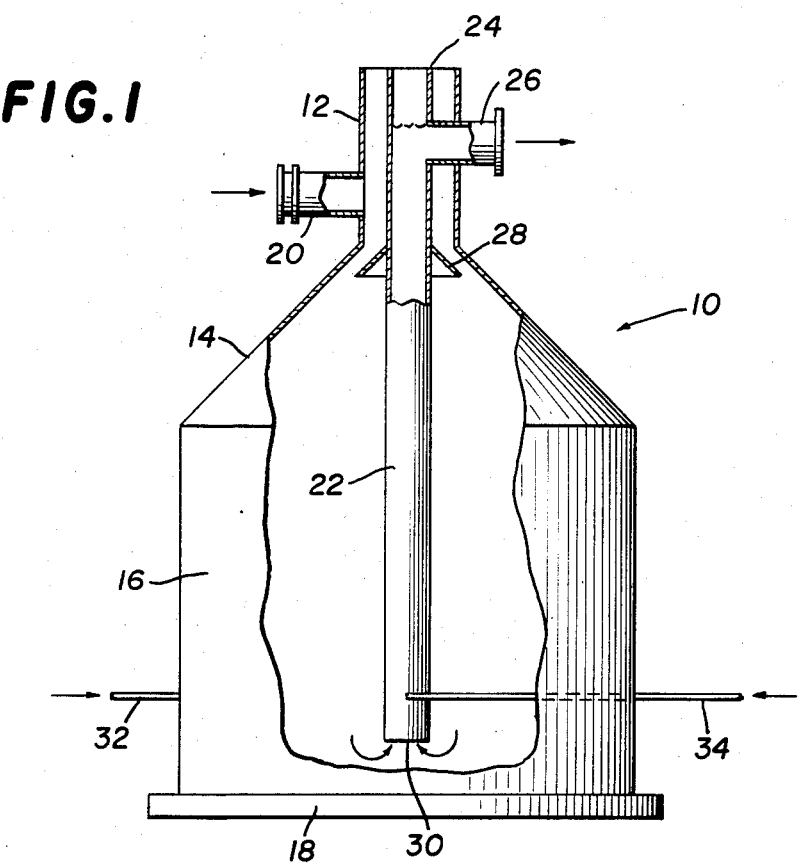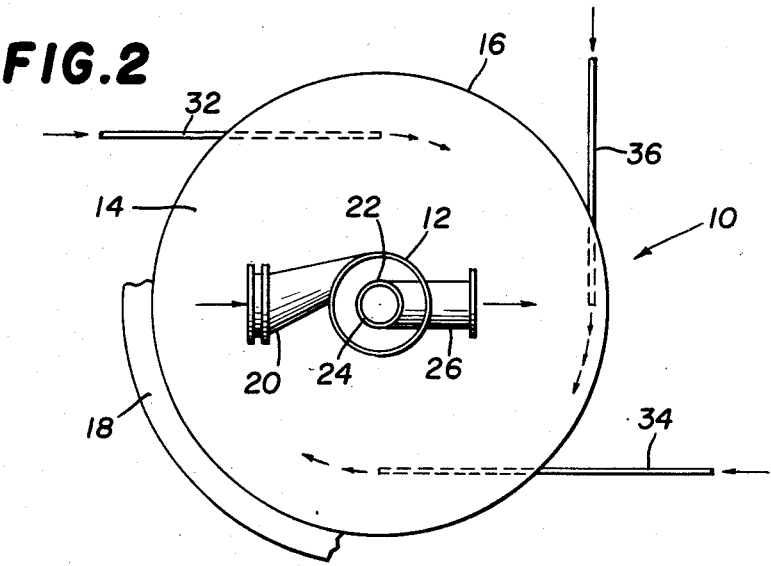

APPARATUS AND METHOD FOR DISSOLVING A GAS IN AN AQUEOUS STREAM

This invention relates to apparatus and methods for dissolving a gas in an aqueous stream. More particularly, the invention provides novel apparatus and methods which facilitate dissolving a gas in water by increasing the gas-water contact time and flow distance, thereby reducing the amount of gas which might otherwise remain undissolved and escape. The invention has a particular practical application in dissolving carbon dioxide gas in a lime softened aqueous stream in a water treatment plant to reduce the pH from about 10 to 11 down to about 8 to 9 to thereby stabilize the water and suppress mineral precipitates from developing.

BACKGROUND OF THE INVENTION

It is often desirable commercially and industrially to dissolve a gas in an aqueous body or stream. Some gases which are dissolved in aqueous streams include chlorine, chlorine dioxide, oxygen, ozone and carbon dioxide. Even though some gases dissolve faster, and have a greater solubility, than others it is generally recognized as a difficult control problem to feed a gas into the water at a rate which is acceptable for efficiency and yet will lead to essentially total dissolution of the gas volume feed. The limited contact time in which dissolution can be effected, when it is considered that gas bubbles rise at a rate of about 0.75 to 1 ft/sec when a gas is fed into the bottom of an aqueous pool, is often not enough to prevent undissolved gas from escaping and being lost when the water retaining means is open to the atmosphere or has a top gas collecting space.

One area where gas dissolution is particularly important is in a water treatment plant, especially a city or municipal plant. It is very common in such plants to include a lime treatment step to soften the water by removing calcium and also at times magnesium. Sodium carbonate is also added if the water contains non-carbonate hardness, usually in the form of sulfates of calcium or magnesium. The result of such treatment is that the pH of the water is raised above 10. This leads to unstable water that is supersaturated with calcium carbonate, which will subsequently be converted into an insoluble form and precipitate on filter media and in plant and distribution system piping and equipment. To convert the unstable water to a stable form it has been conventional to dissolve carbon dioxide gas in the water in a recarbonation basin so that the carbonic acid which forms can react with the alkaline materials in the water and lower the pH to about 8 to 9. This leads to stable water having carbonate equilibrium so there is neither carbonate scaling upon further handling and transport of the water where it is to be used, nor is the water corrosive to piping and equipment.

After dissolution of the carbon dioxide in the lime softened water, some retention time is necessary to complete the reaction between dissolved carbon dioxide and the hydroxide and carbonate ions. This time may vary from 10 to as much as 30 minutes, depending on the chemical quality and the temperature of the specific water.

Waters treated to a high pH of around 11 for magnesium removal contain excess lime which is removed as precipitated calcium carbonate as the pH is lowered by carbon dioxide. Further additon of carbon dioxide converts remaining normal dissolved calcium carbonates to bicarbonates to the extent required to produce a stable water. This type of water, especialy if cold, will require a longer reaction time, whereas a warm water softened to a pH of about 10 for calcium removal only has to convert dissolved carbonates to bicarbonates, and the reaction time can be shorter.

The quantity of carbon dioxide required for stabilization depends upon the specific chemical quality and pH of the water involved, and it may range from about 100 to 300 pounds of carbon dioxide per million gallons of water treated. Based on feeding pure carbon dioxide gas with a specific volume of 8.73 cubic feet per pound at 70° F. and 1 atmosphere pressure, it would require a range of 0.606 to 1.82 cubic feet per minute of carbon dioxide gas per 694.4 gallons per minute of water (1 million gallons per day), assuming complete dissolution of the carbon dioxide gas. This is a volume ratio of 0.6 to 1.82 cubic feet of carbon dioxide per 92.83 cubic feet of water.

Water treatment plants which include a carbon dioxide dissolution step generally feed the gas into the bottom of a tank or vessel containing the water to be treated. The tank is usually partially or wholly open at the top, so that undissolved gas which reaches the water surface escapes and is lost. This represents an economic loss. While the loss has been noted for many years there is need for a more economical solution to the problem. Any solution must obviously be achieved with minimum capital investment and low operating cost since the goal is to provide high quality water in high volume at minimum cost. Equipment and methods used must be easy to operate, have high reliability, be inexpensive and be uncomplicated. Such goals are met by the apparatus and methods of dissolving gas in an aqueous pool or stream according to the invention.

SUMMARY OF THE INVENTION

According to one aspect of the invention, a method of dissolving a gas in water is provided which comprises directing an aqueous stream to rotate in a downwardly moving spiral stream from a high downward velocity to a lower downward velocity; and, diffusing a gas into the aqueous stream so as to produce small gas bubbles which are rotated in a generally spiral path by the aqueous stream thereby providing a long flow distance over which the bubbles have increased contact time with the aqueous stream to facilitate dissolution of the gas therein and in which rising of the gas bubbles is progressively opposed by the increased downward velocity of the aqueous stream higher in the vessel.

More specifically, the invention provides a method of dissolving a gas in water which comprises feeding an aqueous stream through an inlet into a vessel having a vertical axis and which is circular in horizontal section for most of its height, the vessel having upper and lower ends, the vessel including a conical portion with the apex at the upper end of the vessel, and with the aqueous stream inlet tangential to the vessel and communicating with the vessel interior space near the vessel upper end, whereby the aqueous stream rotates in a downwardly moving spiral stream from a high downward velocity in the upper portion of the vessel to a lower downward velocity in the lower portion of the vessel; and diffusing a gas into the aqueous stream in the vessel so as to produce small gas bubbles which are rotated in a generally spiral path by the aqueous stream thereby providing a long flow distance over which the bubbles have increased contact time with the aqueous stream to facilitate dissolution of the gas therein and in which rising of the gas bubbles is progressively opposed by the increased downward velocity of the aqueous stream higher in the vessel.

The gas can be carbon dioxide, oxygen, chlorine, chlorine dioxide, ozone, or any other gas which can be dissolved to any extent in water.

The method is particularly useful in dissolving carbon dioxide in an aqueous stream pretreated with an alkaline water softening material which raises the water pH above 10 since the dissolved carbon dioxide forms carbonic acid which lowers the pH of the aqueous stream.

The method is operated efficiently when the downflow velocity of the aqueous stream in the upper portion of the vessel is about 1 to 5 ft/sec and the downflow velocity of the aqueous stream in the lower portion of the vessel is about 0.01 to 0.1 ft/sec. Additionally, the aqueous stream inlet velocity can be about 2 to 10 ft/sec.

The method can also include removing an aqueous stream containing dissolved gas from the lower portion of the vessel. One means for doing this is a vertically positioned axially located tube having its lower end near the bottom of the vessel and having means to feed the stream out the upper portion of the vessel.

In an alternative manner, the aqueous stream containing dissolved gas can flow out a bottom portion of the vessel into a surrounding reaction tank and the aqueous stream can then be withdrawn from an upper portion of the tank.

It is generally desirable to feed the gas into the lower portion of the vessel.

A stream of water can be fed into the lower portion of the vessel codirectional to rotational flow of the aqueous stream to maintain rotational flow of the aqueous stream.

According to a second aspect of the invention there is provided a vessel, for dissolving a gas in water, having a vertical axis and which is circular in horizontal section for most of its height. The vessel has upper and lower ends, a conical portion with the apex at the upper end of the vessel, and an aqueous stream inlet tangential to the vessel and communicating with the vessel interior space near the vessel upper end, whereby an aqueous stream fed to the vessel through the inlet rotates in a downwardly moving spiral stream from a high downward velocity in the upper portion of the vessel to a lower downward velocity in the lower portion of the vessel.

The vessel also has a gas diffuser means in the vessel for diffusing a gas into the aqueous stream so as to produce small gas bubbles which are rotated in a generally spiral path by the aqueous stream thereby providing a long flow distance over which the bubbles have increased contact time with the aqueous stream to facilitate dissolution of the gas therein and in which rising of the gas bubbles is progressively opposed by the increased downward velocity of the aqueous stream higher in the vessel.

A more specific embodiment of the vessel includes a vertically positioned axially located tube extending through the conical portion apex to terminate above the vessel tangential inlet; an outlet, for the aqueous stream, communicating with the upper portion of the tube and extending out of the vessel; and with the lower portion of the tube having an access opening for the aqueous stream to flow from the lower portion of the vessel into the tube.

The vessel and the tube can be open at the top to the atmosphere or one or both can be closed.

The vessel conical portion apex can be joined to a cylindrical upper portion containing the aqueous liquid inlet. Also, the vessel can have a vertical cylindrical circular body portion extending from the vessel bottom to the conical portion.

The gas diffuser means in the vessel can include at least one pipe positioned to feed gas into the vessel. Also, the vessel can have at least one pipe positioned to feed a stream of water into the lower portion of the vessel codirectional to rotational flow of the aqueous stream.

In an additional aspect of the invention there is provided a combination comprising a reaction tank having a bottom and side wall extending up from and joined to the bottom thereby defining an aqueous liquid retaining space; and a vessel, for dissolving a gas in water, having a vertical axis and which is circular in horizontal section for most of its height, the vessel having upper and lower ends, the vessel including a conical portion with the apex at the upper end of the vessel, and an aqueous stream inlet tangential to the vessel and communicating with the vessel interior space near the vessel upper end, whereby an aqueous stream fed to the vessel through the inlet rotates in a downwardly moving spiral stream from a high downward velocity in the upper portion of the vessel to a lower downward velocity in the lower portion of the vessel. The vessel is positioned vertically in the tank and has means at the vessel bottom portion for an aqueous stream to flow out of the vessel into the tank; means at the upper portion of the tank for removing an aqueous stream from the tank; and, a gas diffuser means in the vessel which operates as already described.

The vessel conical portion apex can be joined to a cylindrical upper portion containing the aqueous liquid inlet. Also, the vessel can have a vertical cylindrical circular body portion joined to and extending downward from the conical portion. Additionally, the vessel can be open at the top to the atmosphere.

BRIEF DESCRIPTION OF THE DRAWINGS

FIG. 1 is an elevational view, partially in section and partially broken away, of a vessel for dissolving a gas in an aqueous stream;

FIG. 2 is a plan view of the vessel illustrated by FIG. 1;

DETAILED DESCRIPTION OF THE DRAWINGS

Figure 3:
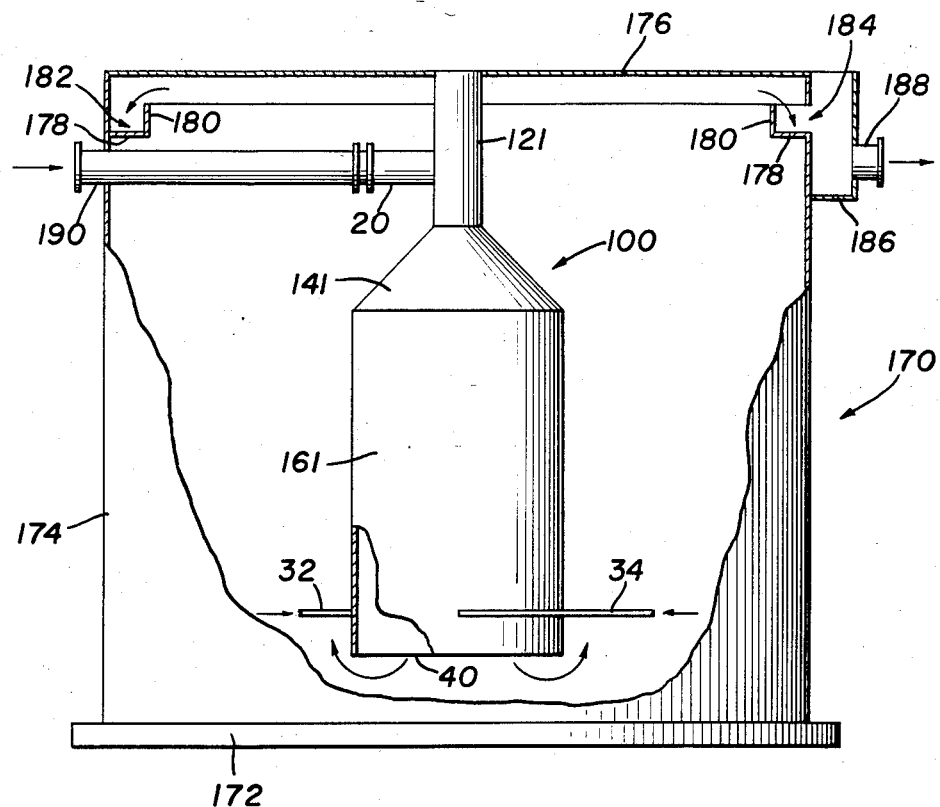
FIG. 3 is an elevational view, partially in section and partially broken away, of the combination of a reaction tank with a vessel, for dissolving a gas in an aqueous stream, positioned in the tank.

To the extent it is reasonable and practical the same numbers will be used to identify the same or similar elements in the various views of the drawings.

With reference to FIGS. 1 and 2, the vessel 10 embodiment shown in these figures has a vertical cylindrical circular top portion 12 joined at its lower edge to the apex of truncated conical portion 14 which is joined at its lower edge to vertical cylindrical circular body portion 16. The lower edge of cylindrical body portion 16 is joined to vessel bottom 18.

An aqueous stream inlet 20 is connected to cylindrical top portion 12 so as to communicate tangenially with the interior thereof. Inlet 20 is circular in cross-section at its outer end but it gradually varies in shape until it achieves a rectangular cross-sectional shape which coincides with a similar shaped opening in cylindrical top portion 12.

A vertically positioned axially located tube 22 is located in vessel 10. Tube 22 extends through the axial center of lower cylindrical body portion 16, the axial center of conical portion 14 and the axial center of cylindrical top portion 12. The upper end 24 of tube 22 is open and terminates at the open top end of cylindrical top portion 12. Aqueous stream outlet 26 communicates with the upper portion of tube 22 and extends out through the cylindrical top portion 12. Outlet 26 is located higher than inlet 20, but below the vessel top, so that aqueous liquid will not overflow the vessel top.

An optional conical baffle 28 can be mounted on tube 22 a short distance below the apex of conical portion 14. Such a baffle can guide the aqueous stream into a downwardly moving helical or spiral flow pattern in the vessel.

The lower end 30 of tube 22 terminates a short distance above vessel bottom 18, thereby providing space for the aqueous stream to flow from the space surrounded by cylindrical body portion 16 into tube 22.

The vessel illustrated by FIGS. 1 and 2 is provided with two horizontally positioned gas diffuser pipes 32, 34 located in the lower portion of vessel 10. Each of these gas diffuser pipes is shown positioned substantially tangentially to the vessel. When so positioned the gas to be dissolved can be fed codirectional to the rotational flow of the aqueous stream in the vessel. However, it is not essential that the gas be introduced into the aqueous stream in codirectional flow because upward, downward, lateral and radial gas flow may also be suitably employed.

To maintain rotational flow of the aqueous stream in the lower part of the vessel 10, it is desirable to include a pipe 36 which communicates with the lower internal space of vessel 10 for feeding a stream of water thereto in codirectional rotational flow of the aqueous stream.

The vessel illustrated by FIGS. 1 and 2 is highly suitable for dissolving a gas in an aqueous stream. It is especially useful to dissolve carbon dioxide in a warm aqueous stream which has been lime treated to soften it by removal of calcium only, thereby raising the water pH to about 10. In this case, a shorter reaction time is required since only dissolved carbonates need be converted to bicarbonates. The softened alkaline aqueous stream is fed to vessel 10 through inlet 20. The cylindrical to portion 12 develops a strong horizontal high velocity rotation in the aqueous stream. As the aqueous stream flows into the conical portion 14, the stream develops a downwardly spiral rotational flow which persists as the liquid flows, although at lower velocity, into lower cylindrical body portion 16. The helical flow increases the flow path length thus increasing the time available for the gas supplied by diffuser pipes 32, 34 to dissolve in the aqueous stream. Increasing the flow path length also serves to substantially widen the effective reaction time during which the carbon dioxide can react with the alkalinity in the water. After the pH of the water has been reduced as described to about pH 9 or less, the treated water is withdrawn from the vessel. This is most readily done by withdrawing the water or aqueous stream through the bottom 30 of tube 22 and then feeding it through outlet 26. It should be understood, however, that other means for removal of treated water from vessel 10 can be used. Thus, the treated aqueous stream can be withdrawn from the bottom portion of vessel 10 through an adjacent outlet.

Figure 4:
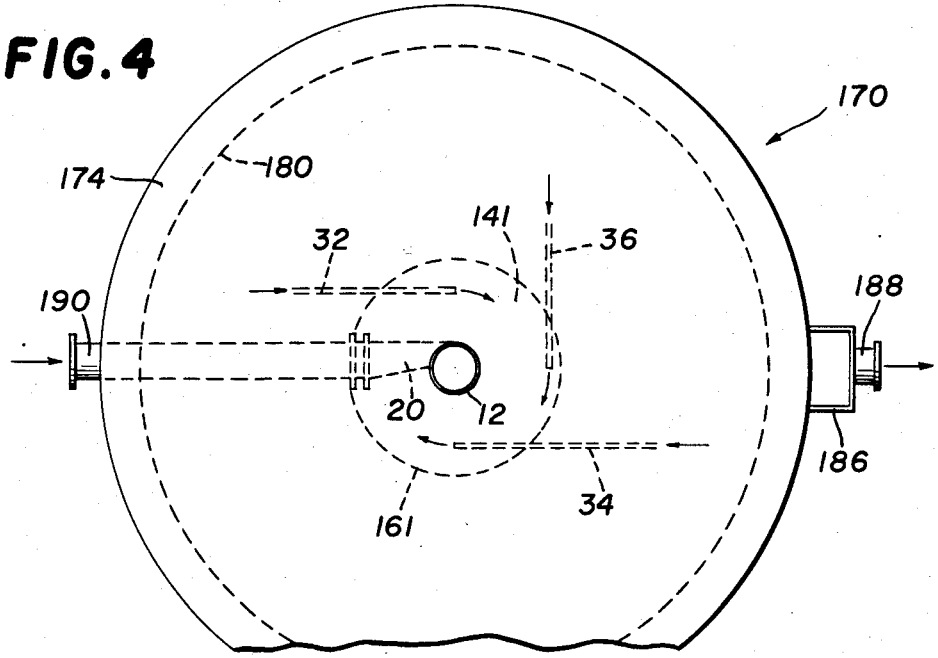
FIG. 4 is a plan view of the combination tank and vessel illustrated by FIG. 3

Turning now to FIGS. 3 and 4 of the drawings, it will be seen that vessel 100, for dissolving a gas in water, has a vertical axis and is circular in horizontal section for most of its height. Conical portion 141 is joined at its upper end to the lower end of cylindrical portion 121, while the lower end of conical portion 141 is joined to the upper end of lower cylindrical body 161. Gas diffuser pipes 32, 34 and water supply pipe 36 are included in vessel 100 in a manner essentially like they are positioned in vessel 10 shown in FIGS. 1 and 2. It should also be noted that the lower end 40 of cylindrical body portion 161 is entirely open, thereby permitting the aqueous stream fed to the vessel 100 to flow out freely into reaction tank 170.

Reaction tank 170 has a flat bottom 172 to which upwardly extending vertical cylindrical circular wall 174 is joined. Roof 176, which is optional, is supported by the top of wall 174. The upper end of the vessel cylindrical top portion 121 communicates with the atmosphere through a hole in roof 176.

A short distance below the roof 176, and joined to the inside of wall 174, is an angle member having a horizontal web 178 and a vertical flange 180. The angle member, together with the adjoining tank wall, form a circular trough 182 around the inside of the tank wall. An outlet opening 184 is provided in wall 174 in liquid communication with the trough 182 for removing liquid from the trough and delivering it to liquid collecting box 186 provided with outlet 188.

Inlet conduit 190 extends through tank wall 174 and is joined to vessel inlet 20 thereby providing means to feed an aqueous stream to the vessel 100.

The combination of gas dissolving vessel 100 and reaction tank 170 illustrated by FIGS. 3 and 4 is especially useful in treating water when a substantial reaction time is required following dissolution of a gas in an aqueous stream. Thus, the combination is useful in treating a cold aqueous stream which has been softened with excess lime to remove calcium and magnesium whereby the resulting highly alkaline water is at about pH 11. The excess lime is removed as precipitated calcium carbonate as the pH is lowered by carbon dioxide. Further addition of carbon dioxide converts dissolved calcium carbonates to bicarbonates to the extent required to produce a stable water. These reactions require a longer retention time to go to completion and such time is provided by this apparatus.

The highly alkaline stream can be fed by conduit 190 to inlet 20 which delivers the stream tangentially at high velocity into cylindrical top portion 121. The stream flows in a spiral rotational downward flow path into conical portion 141 and then into cylindrical body portion 161. As it flows downwardly it decreases in velocity. As the stream flows along the described extended helical path, carbon dioxide gas can be diffused into the stream by diffuser pipes 32, 34. If desired, rotational movement can be maintained or increased by feeding a stream of water into the vessel by pipe 36. The aqueous stream containing dissolved carbon dioxide flows out the open bottom of vessel 100 into tank 170. The aqueous stream in due course fills the tank and spills over the top of flange 180 into trough 182 which feeds it along a circular path to outlet 184. From outlet 184 the aqueous stream flows into collecting box 186 and then through outlet 188.

Although complete dissolution of the required volume of carbon dioxide gas is effected in vessel 100, the chemical reactions needed to stabilize the water do not generally go to completion while the liquid is in the vessel. Accordingly, the liquid containing the dissolved gas is transferred to the reaction tank 170 to provide greater time for the reactions to go to completion. Completing the reactions in this way will avoid having insoluble mineral compounds form later and precipitate out in filter beds or form scale in piping.

The following example is presented to further illustrate the invention.

EXAMPLE

A carbonation vessel embodiment as illustrated by FIGS. 1 and 2 can be dimensioned as follows for incorporation in a 3 million gallon per day water treatment plant:

| | |
|---|---|
| Height | 27.5 ft. |
| Inlet (rectangular) | 18 × 9 in. |
| Cone volume | 4,000 gals |
| Lower cylindrical volume | 17,300 gals |
| Total volume | 21,300 gals |
| Riser tube | 18 in. |

The aqueous liquid influent can be supplied to the vessel to achieve the following operating conditions:

| | |
|---|---|
| Inlet velocity | 4.1 ft/sec. |
| Throat velocity | 1.5 ft/sec. |
| Average deceleration velocity | 0.5 ft/sec. |
| Velocity at vessel bottom | 0.02 ft/sec. |
| Retention time | 10 min. |

The influent to the vessel can have the following analysis:

| | |
|---|---|
| $CO_2$ | 0 |
| pH | 10.2 |
| Turbidity | 1 NTU |
| Hardness | 100 mg/liter as $CaCO_3$ |
| Calcium | 40 mg/liter as $CaCO_3$ |
| Magnesium | 60 mg/liter as $CaCO_3$ |
| Alkalinity | 20–40 mg/liter as $CaCO_3$ |
| Iron | 0.01 mg/liter as $CaCO_3$ |
| Manganese | 0.01 mg/liter as $CaCO_3$ |
| Fluoride | 1.0 mg/liter as $CaCO_3$ |

Sufficient carbon dioxide is fed into the vessel by the gas diffuser pipes to reduce the pH to 8 to 9, which also lowers the phenolphthalein alkalinity to 5–40. The other values for constituents in the water remain about the same.

The effluent from the carbonation vessel is sent to a conventional filter system for finishing and then is fed to service pumps for distribution.

The foregoing detailed description has been given for clearness of understanding only, and no unnecessary limitations should be understood therefrom, as modifications will be obvious to those skilled in the art.

What is claimed is:

1. A method of dissolving a gas in water which comprises:
   directing an aqueous stream to rotate in a downwardly moving spiral stream from a high downward velocity to a lower downward velocity; and
   diffusing a gas into the aqueous stream so as to produce small gas bubbles which are rotated in a generally spiral path by the aqueous stream thereby providing a long flow distance over which the bubbles have increased contact time with the aqueous stream to facilitate dissolution of the gas therein and in which rising of the gas bubbles is progressively opposed by the increased downward velocity of the aqueous stream higher in the vessel.

2. A method according to claim 1 in which the gas is carbon dioxide.

3. A method of dissolving a gas in water which comprises:
   feeding an aqueous stream through an inlet into a vessel having a vertical axis and which is circular in horizontal section for most of its height, the vessel having upper and lower ends, the vessel including a conical portion with the apex at the upper end of the vessel, and with the aqueous stream inlet tangential to the vessel and communicating with the vessel interior space near the vessel upper end, whereby the aqueous stream rotates in a downwardly moving spiral stream from a high downward velocity in the upper portion of the vessel to a lower downward velocity in the lower portion of the vessel; and
   diffusing a gas into the aqueous stream in the vessel so as to produce small gas bubbles which are rotated in a generally spiral path by the aqueous stream thereby providing a long flow distance over which the bubbles have increased contact time with the aqueous stream to facilitate dissolution of the gas therein and in which rising of the gas bubbles is progressively opposed by the increased downward velocity of the aqueous stream higher in the vessel.

4. A method according to claim 3 in which the gas is carbon dioxide.

5. A method according to claim 3 in which the gas is ozone.

6. A method according to claim 3 in which the gas is oxygen.

7. A method according to claim 3 in which the gas is chlorine dioxide.

8. A method according to claim 3 in which the gas is chlorine.

9. A method according to claim 4 in which the aqueous stream has been pretreated with an alkaline water softening material which raises the water pH above 10 and the dissolved carbon dioxide forms carbonic acid which lowers the pH of the aqueous stream.

10. A method according to claim 3 in which the downflow velocity of the aqueous stream in the upper portion of the vessel is about 1 to 5 ft/sec and the downflow velocity of the aqueous stream in the lower portion of the vessel is about 0.01 to 0.1 ft/sec.

11. A method according to claim 10 in which the aqueous stream inlet velocity is about 2 to 10 ft/sec.

12. A method according to claim 3 including removing an aqueous stream containing dissolved gas from the lower portion of the vessel.

13. A method according to claim 3 including removing an aqueous stream containing dissolved gas from the lower portion of the vessel by means of a vertically positioned axially located tube and feeding the stream out the upper portion of the vessel.

14. A method according to claim 3 in which the aqueous stream containing dissolved gas flows out the bottom of the vessel into a surrounding reaction tank and the aqueous stream is withdrawn from an upper portion of the tank.

15. A method according to claim 3 in which the gas is fed into the lower portion of the vessel.

16. A method according to claim 3 in which a stream of water is fed into the lower portion of the vessel codirectional to rotational flow of the aqueous stream.

17. A method according to claim 3 in which the vessel conical portion is joined to a cylindrical lower portion.

18. A method according to claim 3 in which the vessel conical portion apex is joined to a cylindrical upper portion containing the aqueous stream inlet.

19. A vessel, for dissolving a gas in water, having a vertical axis and which is circular in horizontal section for most of its height;
  the vessel having upper and lower ends;
  the vessel including a conical portion with the apex at the upper end of the vessel;
  an aqueous stream inlet tangential to the vessel and communicating with the vessel interior space near the vessel upper end, whereby an aqueous stream fed to the vessel through the inlet rotates in a downwardly moving spiral stream from a high downward velocity in the upper portion of the vessel to a lower downward velocity in the lower portion of the vessel; and
  a gas diffuser means in the vessel for diffusing a gas into the aqueous stream so as to produce small gas bubbles which are rotated in generally spiral path by the aqueous stream thereby providing a long flow distance over which the bubbles have increased contact time with the aqueous stream to facilitate dissolution of the gas therein and in which rising of the gas bubbles is progressively opposed by the increased downward velocity of the aqueous stream higher in the vessel.

20. A vessel according to claim 19 having a closed bottom;
  a vertically positioned axially located tube in the vessel and extending through the conical portion apex to terminate above the vessel tangential inlet;
  an outlet, for the aqueous stream, communicating with the upper portion of the tube and extending out of the vessel; and
  the lower portion of the tube having an access opening for the aqueous stream to flow from the lower portion of the vessel into the tube.

21. A vessel according to claim 20 having a vertical cylindrical circular body portion extending from the vessel bottom to the conical portion.

22. A vessel according to claim 20 in which the vessel conical portion apex is joined to a cylindrical upper portion containing the aqueous stream inlet.

23. A vessel according to claim 20 in which the vessel and the tube are open at the top to the atmosphere.

24. A vessel according to claim 20 in which the gas diffuser means includes at least one pipe positioned to feed gas into the vessel.

25. A vessel according to claim 20 including at least one pipe positioned to feed a stream of water into the lower portion of the vessel codirectional to rotational flow of the aqueous stream.

26. In combination:
  a reaction tank having a bottom and side wall extending up from and joined to the bottom thereby defining an aqueous liquid retaining space;
  a vessel, for dissolving a gas in water, having a vertical axis and which is circular in horizontal section for most of its height, the vessel having upper and lower ends, the vessel including a conical portion with the apex at the upper end of the vessel, and an aqueous stream inlet tangential to the vessel and communicating with the vessel interior space near the vessel upper end, whereby an aqueous stream fed to the vessel through the inlet rotates in a downwardly moving spiral stream from a high downward velocity in the upper portion of the vessel to a lower downward velocity in the lower portion of the vessel;
  the vessel being positioned vertically in the tank and having means at the vessel bottom portion for an aqueous stream to flow out of the vessel into the tank;
  means at the upper portion of the tank for removing an aqueous stream from the tank; and
  a gas diffuser means in the vessel for diffusing a gas into the aqueous stream so as to produce small gas bubbles which are rotated in a generally spiral path by the aqueous stream thereby providing a long flow distance over which the bubbles have increased contact time with the aqueous stream to facilitate dissolution of the gas therein and in which rising of the gas bubbles is progressively opposed by the increased downward velocity of the aqueous stream higher in the vessel.

27. A combination according to claim 26 in which the vessel has a vertical cylindrical circular body portion extending from the vessel bottom to the conical portion.

28. A combination according to claim 26 in which the vessel conical portion apex is joined to a cylindrical upper portion containing the aqueous stream inlet.

29. A combination according to claim 26 in which the vessel is open at the top to the atmosphere.

30. A combination according to claim 26 in which the vessel gas diffuser means includes at least one pipe positioned to feed gas into the vessel.

31. A combination according to claim 26 in which the vessel has at least one pipe positioned to feed a stream of water into the lower portion of the vessel codirectional to rotational flow of the aqueous stream.

* * * * *

UNITED STATES PATENT AND TRADEMARK OFFICE
CERTIFICATE OF CORRECTION

PATENT NO. : 4,614,596
DATED : September 30, 1986
INVENTOR(S) : David Keith Wyness It is certified that error appears in the above-identified patent and that said Letters Patent is hereby corrected as shown below:

column 1, line 67, change "additon" to -- addition --;
column 4, line 68, change "tangenially" to -- tangentially --;
column 5, line 51, change "to" to -- top --.

Signed and Sealed this

Second Day of December, 1986

Attest:

DONALD J. QUIGG

*Attesting Officer*  *Commissioner of Patents and Trademarks*